(12) United States Patent
Ko

(10) Patent No.: US 8,770,647 B2
(45) Date of Patent: Jul. 8, 2014

(54) WIPER APPARATUS FOR VEHICLE

(75) Inventor: Kyoung Ho Ko, Incheon (KR)

(73) Assignee: Dongyang Mechatronics Corp. (KR)

( * ) Notice: Subject to any disclaimer, the term of this patent is extended or adjusted under 35 U.S.C. 154(b) by 108 days.

(21) Appl. No.: 13/611,777

(22) Filed: Sep. 12, 2012

(65) Prior Publication Data

US 2013/0277528 A1    Oct. 24, 2013

(30) Foreign Application Priority Data

Apr. 20, 2012   (KR) .................. 10-2012-0041602

(51) Int. Cl.
*B60S 1/04* (2006.01)

(52) U.S. Cl.
USPC ..................... 296/96.15; 15/250.31

(58) Field of Classification Search
CPC ....... B60S 1/0447; B60S 1/045; B60S 1/0441
USPC ................................ 296/96.15, 29
See application file for complete search history.

(56) References Cited

U.S. PATENT DOCUMENTS

| | | | |
|---|---|---|---|
| 7,503,615 B2 * | 3/2009 | Albrecht et al. ........... | 296/96.15 |
| 7,600,803 B2 * | 10/2009 | Lipps et al. ............... | 296/96.17 |
| 7,780,214 B2 * | 8/2010 | Kraus et al. ............... | 296/96.15 |
| 2007/0011839 A1 | 1/2007 | Princet et al. | |
| 2008/0189896 A1 | 8/2008 | Kraus et al. | |

FOREIGN PATENT DOCUMENTS

| | | |
|---|---|---|
| DE | 102010063143 A1 | 6/2002 |
| DE | 102004016810 A1 | 10/2005 |
| DE | 102010028610 A1 | 11/2011 |
| JP | 2012046104 A | 3/2012 |
| KR | 20010072421 A | 7/2001 |
| KR | 20100034397 A | 4/2010 |
| KR | 101045773 A | 6/2011 |
| WO | 0034087 A1 | 6/2000 |
| WO | 2005073039 A2 | 8/2005 |

OTHER PUBLICATIONS

Notice of Allowance dated Jun. 4, 2012 of Korean Patent Application No. 10-2012-0041602; 7 pages.
Oddice Action from the German Patant and Trademark Office Application No. 10 2012 220 682.0 Issued: Jul. 15, 2013 10 pages.

* cited by examiner

*Primary Examiner* — Jason S Morrow
(74) *Attorney, Agent, or Firm* — St. Onge Steward Johnston & Reens, LLC

(57) ABSTRACT

A wiper apparatus for a vehicle, including: a frame to receive a wiper driving motor; a supporter formed to protrude from the frame toward an auto body panel; and a jointing member that combines with the supporter and that joins to the auto body panel, wherein the jointing member forms an 'L' shape in a longitudinal cross-section including a direction in which the jointing member is finally assembled into the auto body panel, and includes a first pressing part for contacting and supporting one side of the auto body panel; a second pressing part for contacting and supporting the other side of the auto body panel; and a protruding stopper for preventing the auto body panel from rotating in a direction parallel to the auto body panel.

6 Claims, 8 Drawing Sheets

WIPER APPARATUS FOR VEHICLE

CROSS-REFERENCE TO RELATED APPLICATIONS

The present application claims priority of Korean patent application No. 10-2012-0041602 filed on Apr. 20, 2012, the content of which is incorporated herein by reference.

FIELD OF THE INVENTION

The present invention relates to a wiper apparatus for a vehicle, and more particularly, to a technology to be applied to a windshield wiper apparatus for a vehicle.

BACKGROUND OF THE INVENTION

Generally, a wiper apparatus for a vehicle is a kind of safety device for securing a driver's view by wiping off rain, snow, dust, or stains from the windshield with wiper blades. The wiper apparatus may be mounted not only on the windshield but also on a rear window, an outside rear view mirror, a head lamp, etc. Especially, the wiper apparatus mounted on the windshield typically includes a pair of wiper blades connected to a motor via a linkage tool to operate them. An example of the wiper apparatus is disclosed in the published Korean Patent No. 2001-0072421.

The wiper apparatus includes a wiper motor used as a driving source, a worm & worm-wheel gear used to convert torque and change a rotational direction, and a linkage tool used to rotate wiper blades back and forth with the power delivered from the worm & worm-wheel gear.

The wiper apparatus is generally assembled on an auto body panel with bolts and nuts. Such assembling of the wiper apparatus onto the auto body panel with bolts and nuts arises an issue of dropping working efficiency. Furthermore, conventional assembling requires welding weld nuts onto the auto body panel, thus arising another issue of cost-ineffective manufacturing.

To address the foregoing issues, a few new methods have been proposed. For example, Korean Patent No. 1045773 discloses a wiper apparatus assembled onto the auto body panel by being fitted into the auto body panel in a rotational manner. With the wiper apparatus, however, a worker has difficulty checking with the naked eye whether the wiper apparatus is completely assembled onto the auto body panel. In addition, a vibration control between the auto body panel and the wiper apparatus is so weak that the vibration occurring when the wiper apparatus is working may propagate to the auto body panel.

SUMMARY OF THE INVENTION

The present invention provides a wiper apparatus for a vehicle having improved vibration control and allowing a worker to check the assembly state with the naked eye by improving a structure of the wiper apparatus to be assembled onto an auto body panel in a rotational manner without the need for bolts or screws.

According to an aspect of the present invention, there is provided a wiper apparatus for a vehicle, comprising, a frame to receive a wiper driving motor; a supporter formed to protrude from the frame toward an auto body panel; and a jointing member that is combined with the supporter and that joins to the auto body panel, wherein the jointing member forms an 'L' shape in a longitudinal cross-section including a direction in which the jointing member is finally assembled onto the auto body panel, and comprises a first pressing part for contacting and supporting one side of the auto body panel; a second pressing part for contacting and supporting the other side of the auto body panel and protruding from the first pressing part toward a front direction viewed from a direction in which the second pressing part is finally assembled onto the auto body panel; and a protruding stopper for preventing the auto body panel from rotating in a direction parallel to the auto body panel, wherein the protruding stopper is placed on a front end of the second pressing part.

The jointing member may comprise a damper assembled onto the supporter by being fitted to an end part of the supporter, the damper comprising an elastic material to absorb vibration; a base member assembled onto the supporter by being fitted to the damper in order not to directly contact the supporter, the base member comprising the first pressing part and the second pressing part; and a clip member removably assembled onto the base member, the clip member comprising the protruding stopper.

The supporter may comprise an anti-breakaway sill for supporting an end part of the damper to prevent the damper from breaking away from the supporter.

The damper may comprise an anti-movement groove for preventing the base member from breaking away from the damper, and the base member may comprise an anti-movement hook that inserts into the anti-movement groove.

The base member may have at least a rib for strength reinforcement formed on one side thereof.

The wiper apparatus for a vehicle may comprise a plurality of jointing members, wherein at least one of the jointing members comprises an auxiliary stopper that is elastically caught in an auxiliary groove formed in the auto body panel so that the at least one jointing member is not separated from the auto body panel by an unexpected external force.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
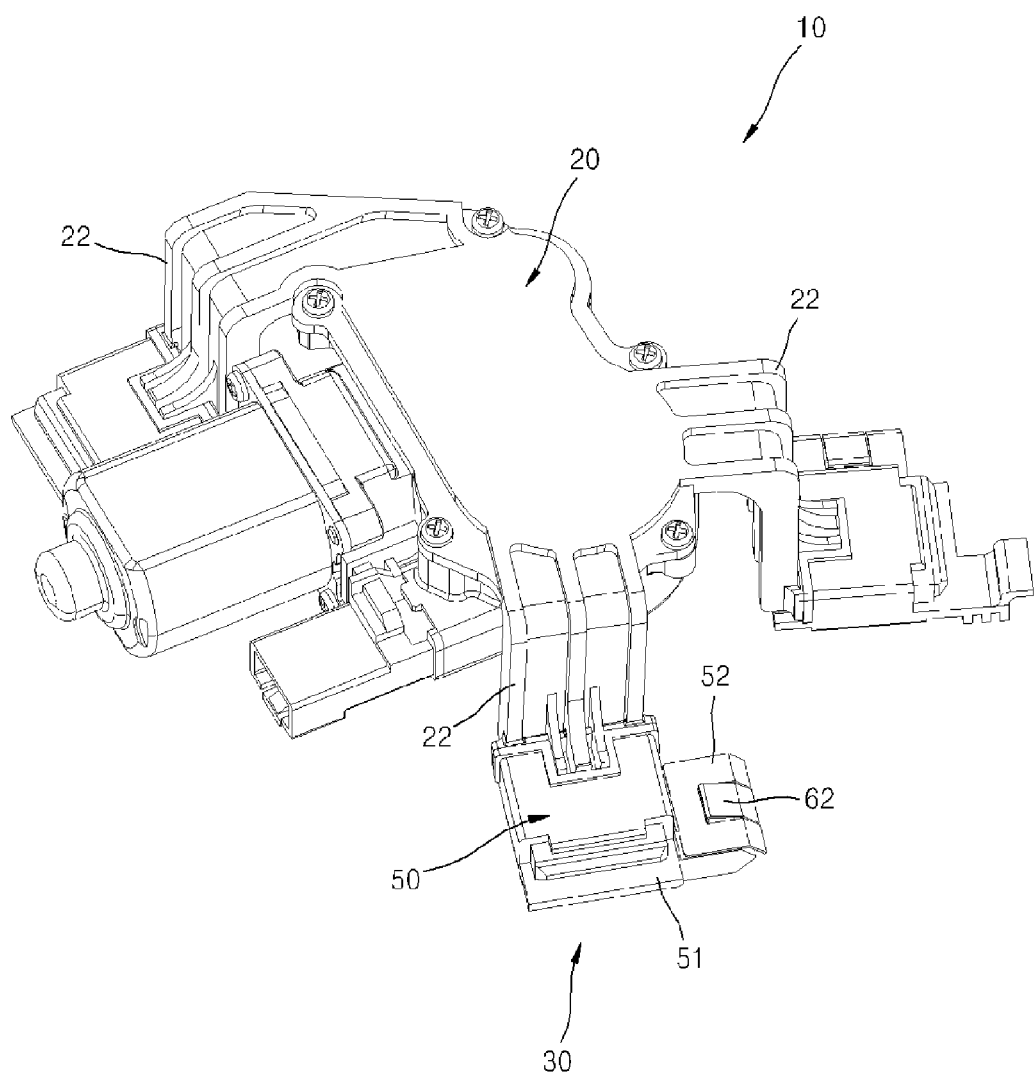
FIG. 1 is a perspective view of a wiper apparatus for a vehicle, according to an embodiment of the present invention.
Figure 2:
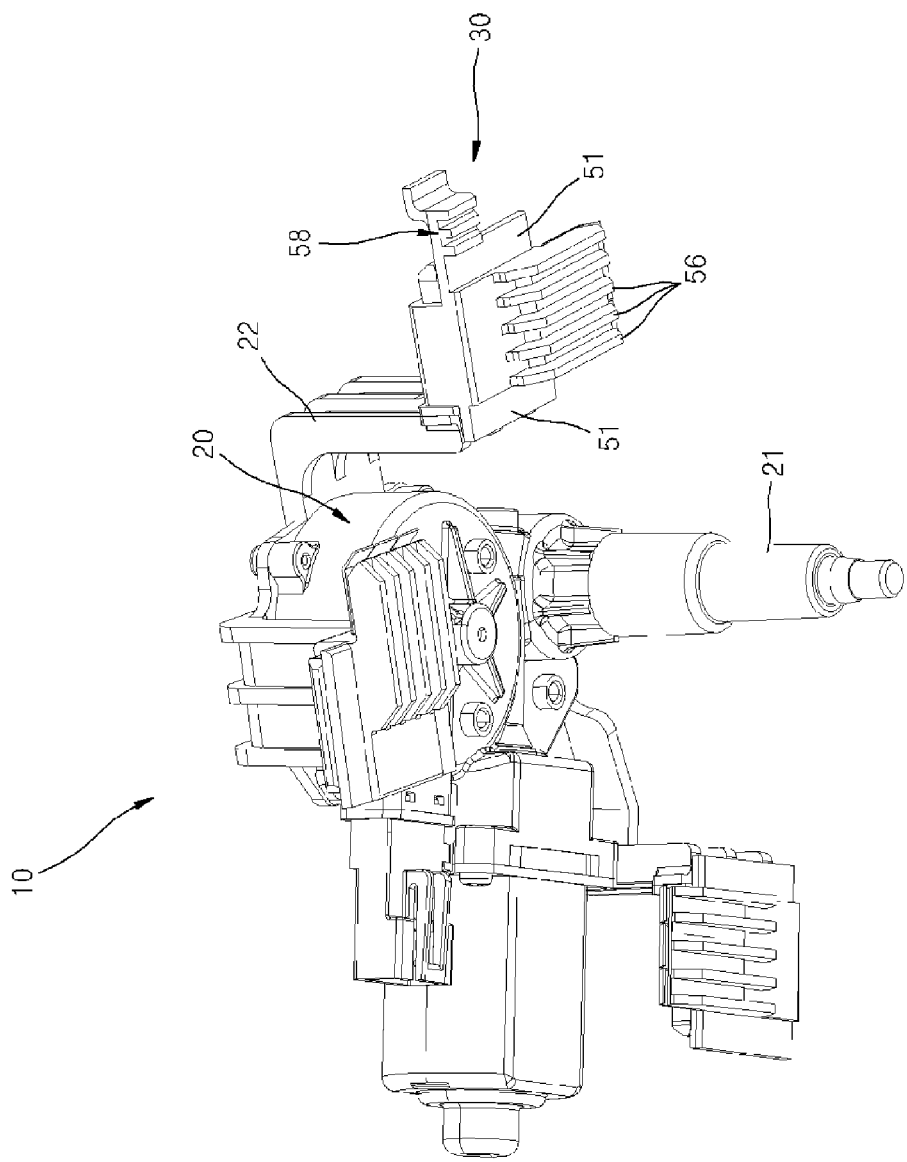
FIG. 2 is a diagram of the wiper apparatus of FIG. 1, viewed from a different direction.
Figure 3:
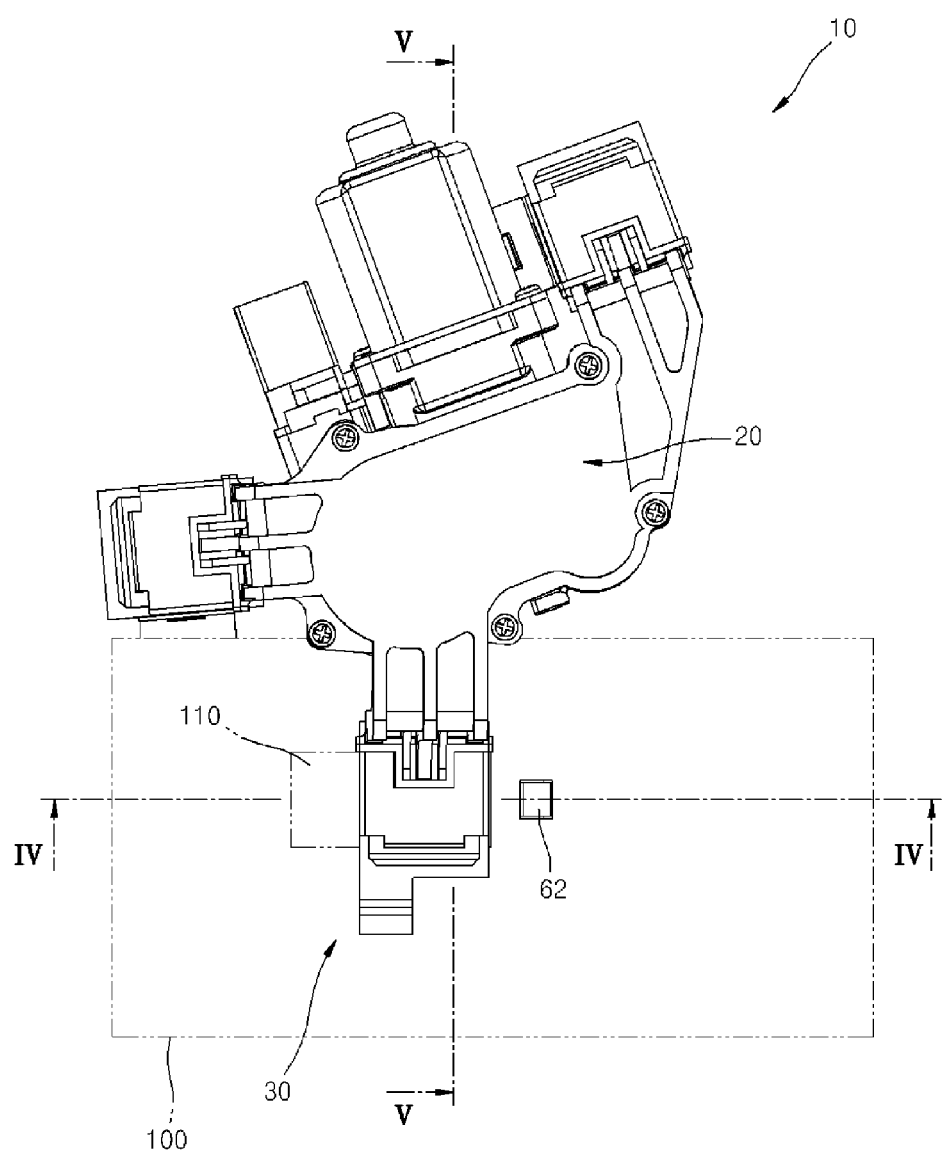
FIG. 3 is a plane view of the wiper apparatus of FIG. 1.
Figure 4:
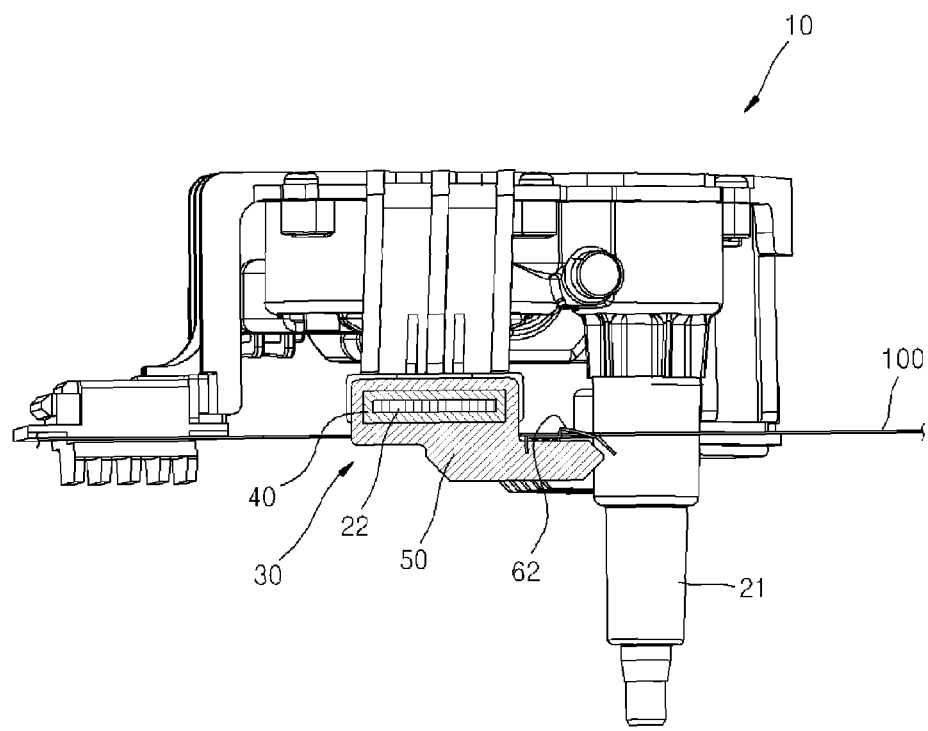
FIG. 4 is a cross-sectional view along line IV-IV shown in FIG. 3.
Figure 5:
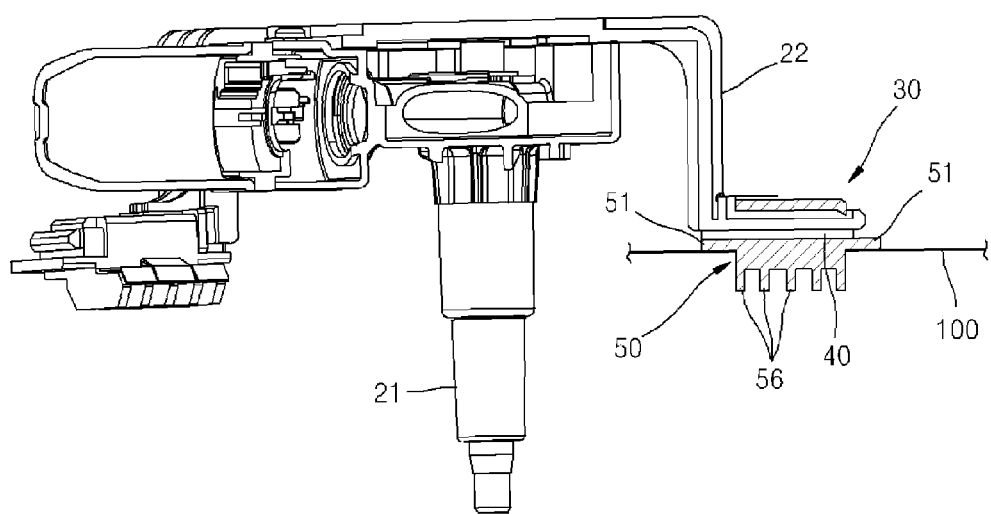
FIG. 5 is a cross-sectional view along line V-V shown in FIG. 3.
Figure 6:
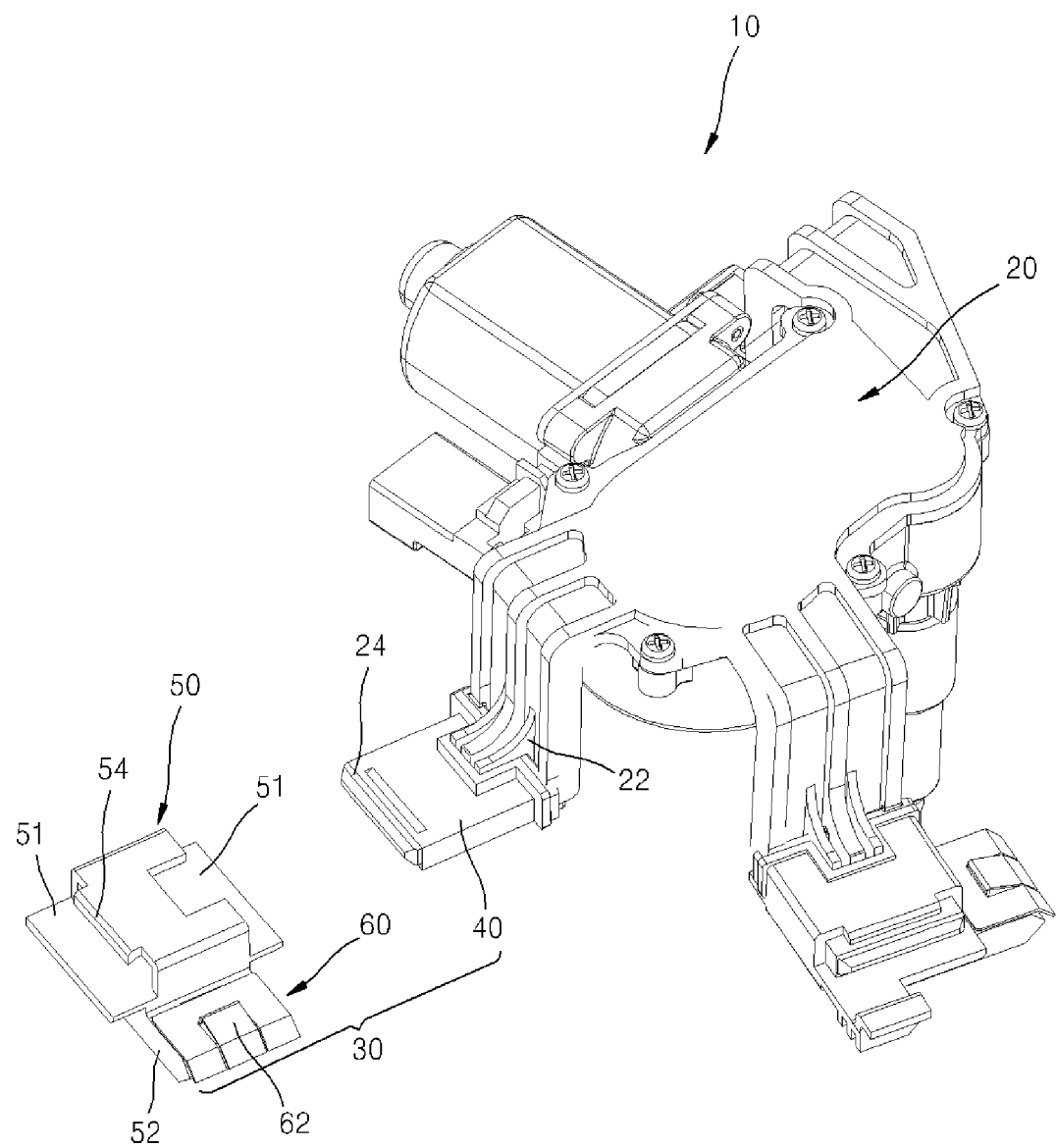
FIG. 6 is a diagram of the wiper apparatus with a jointing member separated therefrom.
Figure 7:
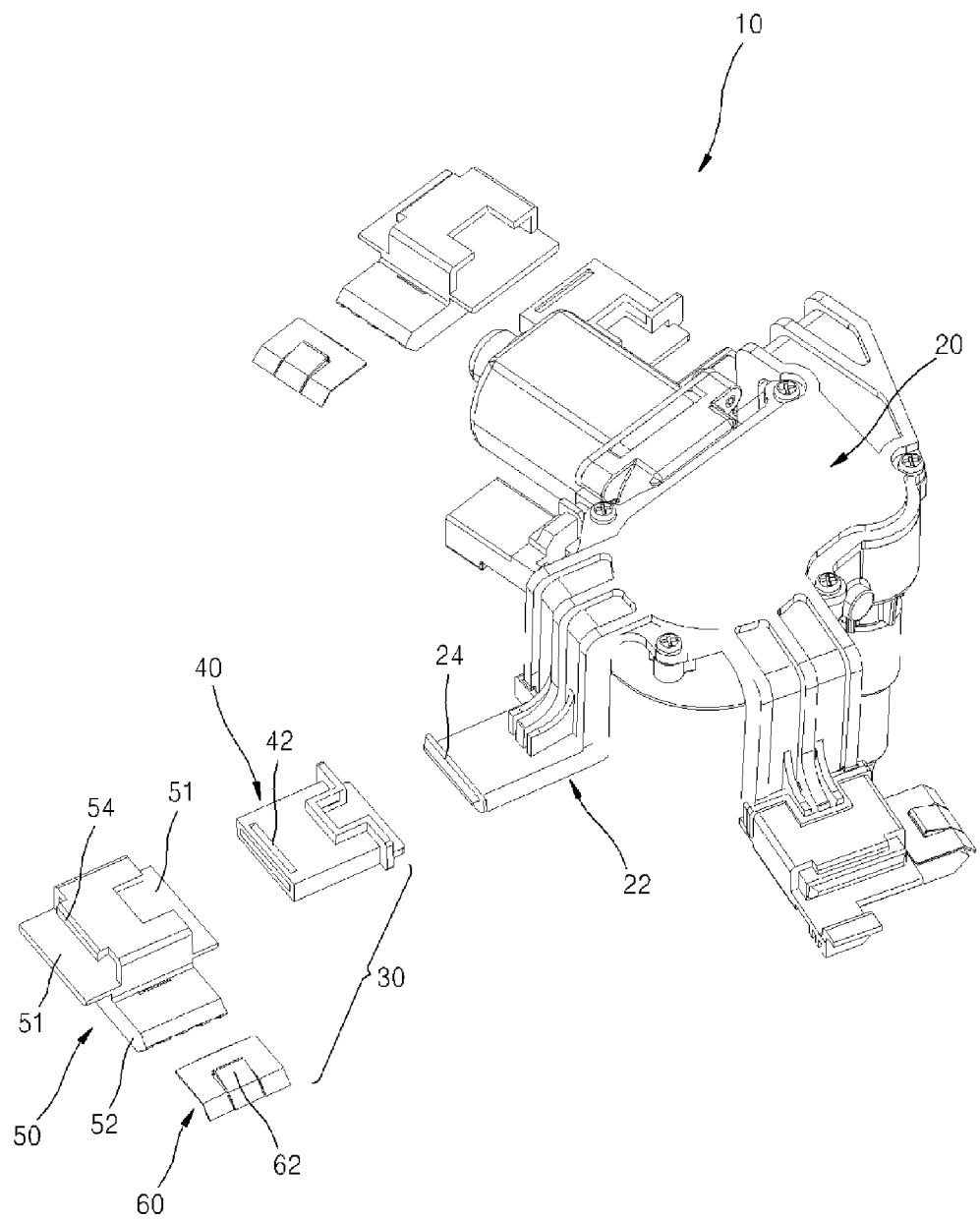
FIG. 7 is a split perspective view of main elements of the jointing member of FIG. 6.
Figure 8:
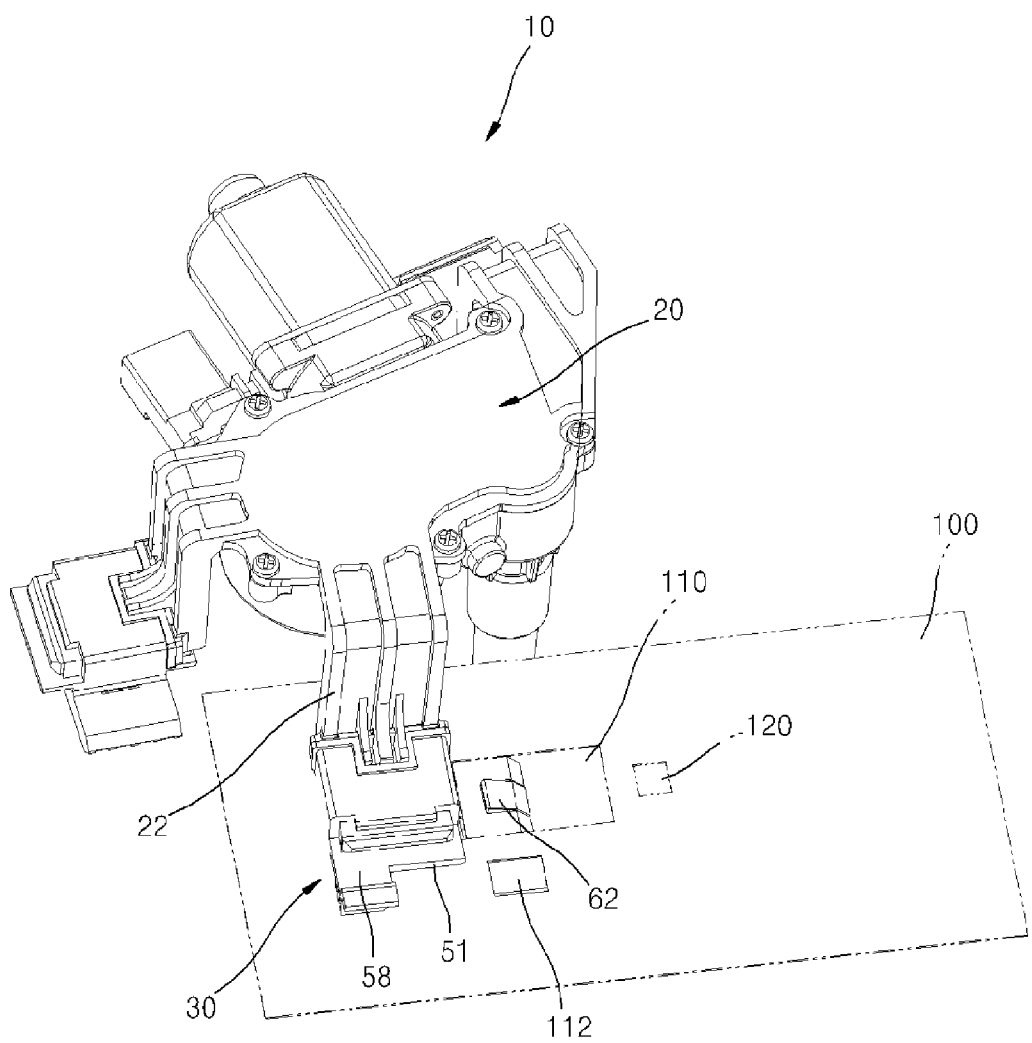
FIGS. 8 and 9 show a procedure of assembling the wiper apparatus of FIG. 1 onto an auto body panel.
Figure 9:
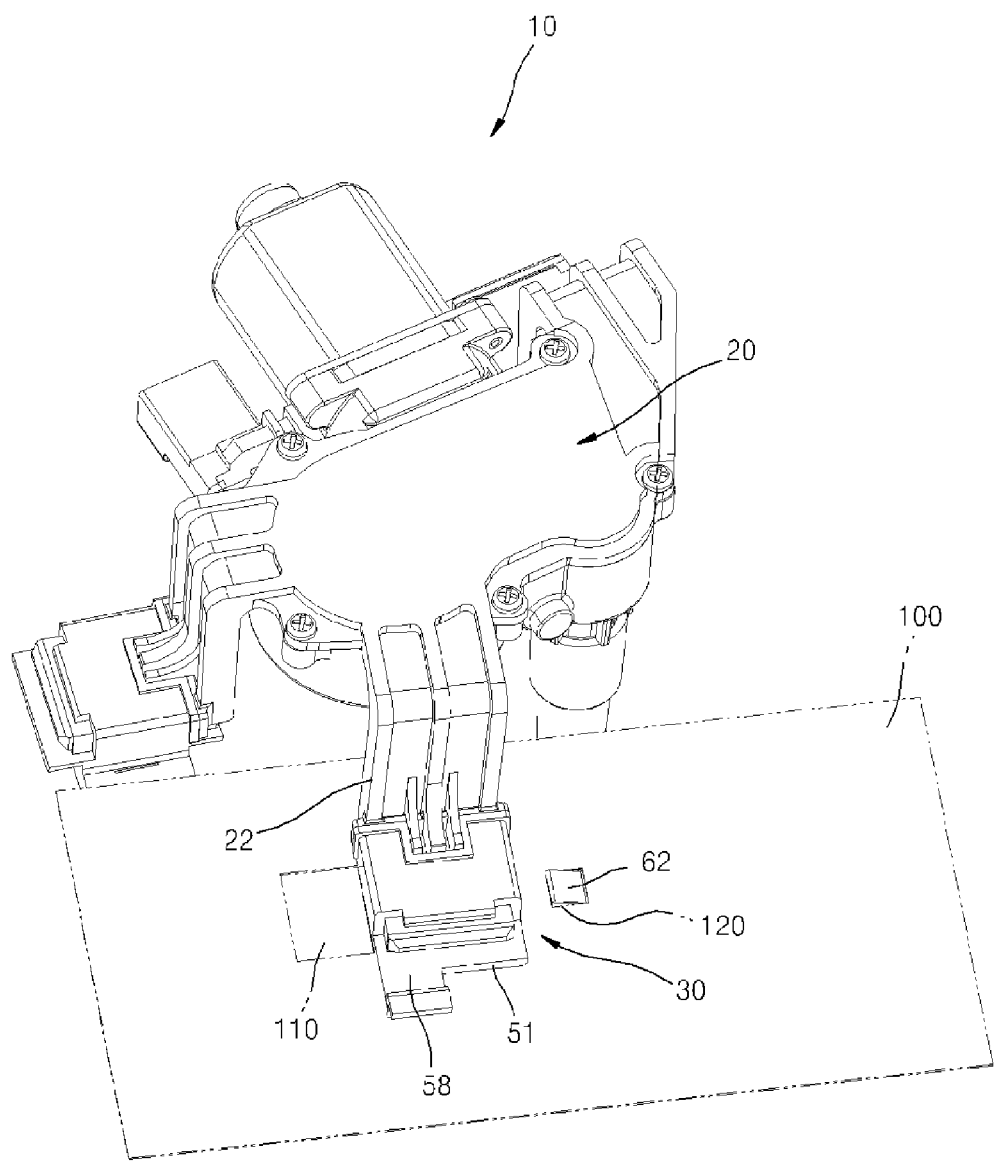

FIG. 1 is a perspective view of a wiper apparatus 10 for a vehicle, according to an embodiment of the present invention. FIG. 2 is a diagram of the wiper apparatus 10 of FIG. 1, viewed from a different direction. FIG. 3 is a plane view of the wiper apparatus 10 of FIG. 1. FIG. 4 is a cross-sectional view along line IV-IV shown in FIG. 3. FIG. 5 is a cross-sectional view along line V-V shown in FIG. 3. FIG. 6 is a diagram of the wiper apparatus 10 with a jointing member 30 separated therefrom. FIG. 7 is a split perspective view of main elements of the jointing member 30 of FIG. 6. FIGS. 8 and 9 show a procedure of assembling the wiper apparatus 10 of FIG. 1 onto an auto body panel 100.

Referring to FIGS. 1 to 9, the wiper apparatus 10 is an apparatus for cleaning e.g. a windshield or rear window of a vehicle. The wiper apparatus 10 includes a frame 20, a supporter 22, and the jointing member 30.

The frame 20 receives a wiper driving motor. An output axis 21 of the wiper driving motor protrudes outside the frame 20. The frame 20 may be made of a metal, e.g., aluminum, in a die casting method, or made by injecting synthetic resin.

The supporter 22 is formed to protrude toward the auto body panel 100. Generally, the supporter 22 protrudes in the same direction as the output axis 21. The supporter 22 may be integrally formed with the frame 20. End parts of the supporter 22 extend in a direction in parallel with the auto body panel 100. The supporter 22 includes an anti-breakaway sill 24 supporting an end part of a damper 40, as will be described below, to prevent the damper 40 from breaking away from the supporter 22. A rib for strength reinforcement may be formed on a bending portion of the end part of the supporter 22.

The jointing member 30 is combined with the supporter 22. The jointing member 30 is prepared for assembling the wiper apparatus 10 into the auto body panel 100. A key feature of the present invention lies in the structure of the jointing member 30. A detailed description of the jointing member 30 will now be explained.

The jointing member 30 forms an 'L' shape in a longitudinal cross-section including a direction in which the jointing member 30 is finally assembled into the auto body panel 100. The jointing member 30 is assembled onto the auto body panel 100 by being received into a first assembly hole 110 prepared in the auto body panel 100 in a direction of the output axis 21 and then rotating around the output axis 21 or a virtual output axis parallel to the output axis 21. That is, the assembling is finished by the time a projecting stopper 62 is received into a second assembly hole 120 prepared in the auto body panel 100, as will be described below, as the jointing member 30 rotates.

The jointing member 30 includes the damper 40, a base member 50, and a clip member 60.

The damper 40 is assembled onto the supporter 22 by being fitted to the end part of the supporter 22. The damper 40 is made of an elastic material to absorb vibration. The damper 40 is made of materials, such as, rubber, urethane, etc. The damper 40 includes an anti-movement groove 42 to prevent the base member 50 separation, as will be described below. The damper 40 also includes a flange-shaped sill on its outer frame in order not to make a direct contact with the supporter 22 when the base member 50 moves.

The base member 50 is assembled onto the damper 40 by being fitted to the damper 40 in order not to directly contact the supporter 22. The base member 50 forms an 'L' shape in a longitudinal cross-section including a direction in which the base member 50 is finally assembled into the auto body panel 100. The base member 50 includes a first pressing part 51, a second pressing part 52, and an anti-movement hook 54.

The first pressing part 51 contacts and supports one side of the auto body panel 100. The first pressing part 51 is a wing-shaped extension from a side of the base member 50. The second pressing part 52 contacts and supports the other side of the auto body panel 100. The second pressing part 52 is formed to protrude from the first pressing part 51 in a front direction viewed from a direction in which the second pressing part 52 is finally assembled onto the auto body panel 100. The anti-movement hook 54 is formed to be fitted into the anti-movement groove 42. More specifically, the anti-movement hook 54 is formed to protrude from top to bottom of the jointing member 30. The anti-movement hook 54 prevents the base member 50 from moving relatively to the damper 40 by being received into the anti-movement groove 42 formed in the damper 40. At least a rib for strength reinforcement 56 may be formed on a side of the base member 50. The rib for strength reinforcement 56 is prepared to suppress the base member 50 serving as a frame of the jointing member 30 from being deformed or damaged by an external force.

The clip member 60 is removably assembled onto the base member 50. Specifically, the clip member 60 is assembled onto the second pressing part 52. The clip member 60 includes a protruding stopper 62. The protruding stopper 62 is prepared for preventing the jointing member 30 from rotating in a direction parallel to the auto body panel 100. The protruding stopper 62 is received into the second assembly hole 120 formed in the auto body panel 100. The protruding stopper 62 is placed on a front end of the second pressing part 52, which allows a worker to easily check whether the protruding stopper 62 has been received into the second assembly hole 120. In other words, since the second pressing part 52 is crossly placed on the first pressing part 51 when being assembled together, the second pressing part 52 is not covered by the first pressing part 51 and remains exposed to the worker's view after and during the process of assembling the jointing member 30 onto the auto body panel 100.

There are a plurality of jointing members 30. At least one of the plurality of jointing members 30 includes an auxiliary stopper 58. The auxiliary stopper 58 is included in the base member 50. The auxiliary stopper 58 extends from the first pressing part 51 of the base member 50. The auxiliary stopper 58 plays a role of assisting the functionality of the protruding stopper 62. That is, the auxiliary stopper 58 is formed to be elastically caught by an auxiliary groove 112, as shown in FIG. 8, formed in the auto body panel 100 in order for the jointing member 30, i.e., the base member 50, not to be separated from the auto body panel 100 by an unexpected external force.

Operating effects of the wiper apparatus 10 will now be explained in detail in connection with e.g., a process of combining the jointing member 30 with the supporter 22 and a process of combining the jointing member 30 with the auto body panel 100.

First, referring to FIG. 7, the jointing member 30 is shown with disjointing elements. The process of assembling the jointing member 30 onto the supporter 22 begins with fitting the damper 40 to the supporter 22. In this process, since the damper 40 is made of an elastic material, it may pass over the anti-breakaway sill 24 and then be combined with the supporter 22. While the damper 40 remains combined with the supporter 22, the base member 50 is combined with the damper 40. In the process, the anti-movement hook 54 prepared in the base member 50 is combined with the anti-movement groove 42 prepared in the damper 40. Then, the clip member 60 is assembled onto the base member 50. The clip member 60 may be assembled onto the base member 50 by combining a groove prepared in the base member 50 with a projection prepared in the clip member 60.

A process of assembling the wiper apparatus 10 onto the auto body panel 100 will now be explained with reference to FIGS. 8 and 9.

As shown in FIG. 8, the jointing member 30 is inserted into the first assembly hole 110 prepared in the auto body panel 100. This process is a temporary assembling state in which the first pressing part 51 contacts and supports one side of the auto body panel 100. In this stage, as shown in FIG. 9, the wiper apparatus 10 rotates around the output axis 21 or a virtual axis parallel to the output axis 21. Then, the jointing member 30 rotates along with the first assembly hole 110, making the protruding stopper 62 be received into the second assembly hole 120. Simultaneously, the auxiliary stopper 58 is elastically combined with the auxiliary groove 112 prepared in the proximity of the first assembly hole 110. With the foregoing processes, the wiper apparatus 10 may be completely assembled onto the auto body panel 100. In other words, the wiper apparatus 10 may be easily assembled onto the auto body panel 100 without the need for any combining means, such as, bolts, screws, etc. In addition, since the jointing member 30 is placed in the 'L' shape, where the first pressing part 51 supports one side of the auto body panel 100, the second pressing part 52 supports the other side of the auto body panel 100, and the protruding stopper 62 remains exposed to the worker's view, the worker may easily check whether the jointing member 30 has been completely assembled onto the auto body panel 100. Furthermore, since the damper 40 completely separates the base member 50 and the supporter 22 so that there are no directly contacting portions of both the base member 50 and the supporter 22, vibration from a wiper motor may not propagate to the auto body panel 100. Based on the same principle, vibration from the auto body panel 100 may not propagate to the wiper apparatus 10.

On the other hand, separation of the wiper apparatus 10 from the auto body panel 100 is achieved by applying an external force to the auxiliary stopper 58 to break away from the auxiliary groove 112, and then, in the breakaway state, rotating the wiper apparatus 10 in an opposite direction of the assembly direction.

According to the present invention, the wiper apparatus 10 having an L-shaped assembling unit allows a worker to easily confirm with the naked eye the assembly state of the wiper apparatus 10 in the middle of the process of assembling the wiper apparatus 10 onto the auto body panel 100, thus leading to an improvement of assembly and reducing vibration and noise by improving the damper structure to prevent the vibration from propagating from the wiper apparatus 10 to the auto body panel 100.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wiper apparatus for a vehicle, comprising:
   a frame to receive a wiper driving motor;
   a supporter formed to protrude from the frame toward an auto body panel; and
   a jointing member that is combined with the supporter and that joins to the auto body panel,
   wherein the jointing member forms an 'L' shape in a longitudinal cross-section including a direction in which the jointing member is finally assembled onto the auto body panel, and comprises a first pressing part for contacting and supporting one side of the auto body panel; a second pressing part for contacting and supporting the other side of the auto body panel and protruding from the first pressing part toward a front direction viewed from a direction in which the second pressing part is finally assembled onto the auto body panel; and a protruding stopper for preventing the auto body panel from rotating in a direction parallel to the auto body panel,
   wherein the protruding stopper is placed on a front end of the second pressing part.

2. The wiper apparatus for a vehicle of claim 1, wherein the jointing member comprises,
   a damper assembled onto the supporter by being fitted to an end part of the supporter, the damper comprising an elastic material to absorb vibration;
   a base member assembled onto the supporter by being fitted to the damper in order not to directly contact the supporter, the base member comprising the first pressing part and the second pressing part; and
   a clip member removably assembled onto the base member, the clip member comprising the protruding stopper.

3. The wiper apparatus for a vehicle of claim 2, wherein the supporter comprises an anti-breakaway sill for supporting an end part of the damper to prevent the damper from breaking away from the supporter.

4. The wiper apparatus for a vehicle of claim 2, wherein the damper comprises an anti-movement groove for preventing the base member from breaking away from the damper, and the base member comprises an anti-movement hook that inserts into the anti-movement groove.

5. The wiper apparatus for a vehicle of claim 2, wherein the base member has at least a rib for strength reinforcement formed on one side thereof.

6. The wiper apparatus for a vehicle of claim 1, comprising a plurality of jointing members,
   wherein at least one of the jointing members comprises an auxiliary stopper that is elastically caught in an auxiliary groove formed in the auto body panel so that the at least one jointing member is not separated from the auto body panel by an unexpected external force.

* * * * *